(12) United States Patent
Stabenau

(10) Patent No.: US 8,210,477 B2
(45) Date of Patent: Jul. 3, 2012

(54) VIBRATIONS DAMPER FOR FASTENINGS ELEMENTS IN AIRCRAFTS

(75) Inventor: Hans Günter Stabenau, Sittensen (DE)

(73) Assignee: MKU GmbH, Sittensen (DE)

( * ) Notice: Subject to any disclaimer, the term of this patent is extended or adjusted under 35 U.S.C. 154(b) by 197 days.

(21) Appl. No.: 12/518,065

(22) PCT Filed: Dec. 6, 2007

(86) PCT No.: PCT/EP2007/010914
§ 371 (c)(1),
(2), (4) Date: Jan. 11, 2010

(87) PCT Pub. No.: WO2008/068045
PCT Pub. Date: Jun. 12, 2008

(65) Prior Publication Data
US 2010/0140408 A1 Jun. 10, 2010

(30) Foreign Application Priority Data

Dec. 6, 2006 (DE) .................. 20 2006 018 705 u

(51) Int. Cl.
*B64C 1/06* (2006.01)
(52) U.S. Cl. .................. 244/131; 244/118.1; 244/119
(58) Field of Classification Search ............ 244/117 R, 244/118.1, 118.5, 118.6, 119, 120, 121, 131, 244/137.4
See application file for complete search history.

(56) References Cited

U.S. PATENT DOCUMENTS

| | | | | |
|---|---|---|---|---|
| 3,176,939 A | * | 4/1965 | Mard et al. | 244/118.1 |
| 4,549,602 A | | 10/1985 | Espinoza | |
| 5,102,723 A | * | 4/1992 | Pepin | 428/223 |
| 6,286,785 B1 | * | 9/2001 | Kitchen | 244/121 |
| 6,695,520 B1 | | 2/2004 | Sarno et al. | |
| 2003/0006341 A1 | * | 1/2003 | Buder | 244/118.1 |

FOREIGN PATENT DOCUMENTS

| | | |
|---|---|---|
| DE | 39 13 442 A1 | 10/1990 |
| DE | 20 2006 007845 U1 | 9/2006 |
| FR | 2 779 901 A1 | 12/1999 |
| GB | 1 172 133 | 11/1969 |

* cited by examiner

*Primary Examiner* — Joshua J Michener
*Assistant Examiner* — Medhat Badawi
(74) *Attorney, Agent, or Firm* — Birch, Stewart, Kolasch & Birch, LLP

(57) ABSTRACT

Means for attaching installed parts (14) are cell-side attachment points (15) in a vehicle cell (11) of a vehicle, in particular of an aircraft (10), for conveying goods and passengers. Elastically coupling elements (25, 25a) are installed between the installed parts (14) and their cell-side attachment points (15).

3 Claims, 4 Drawing Sheets

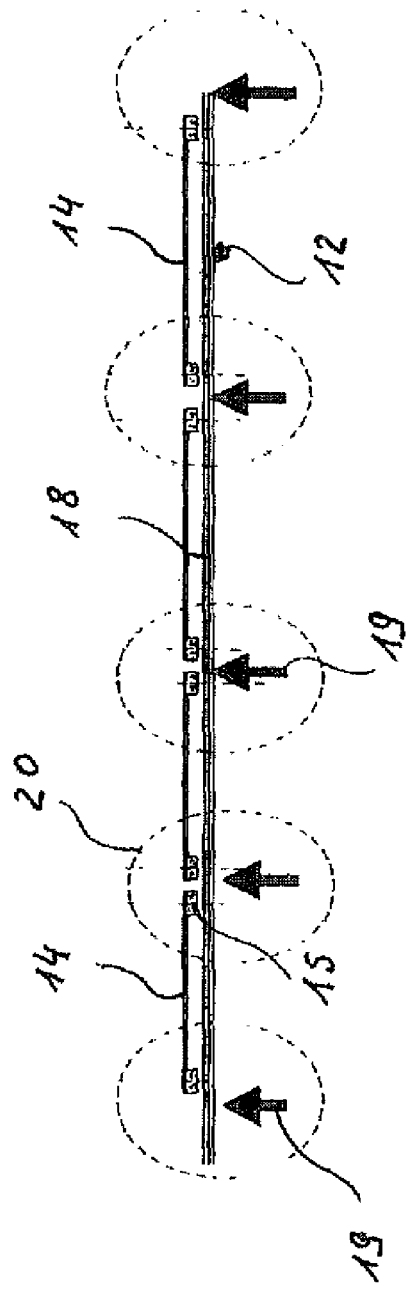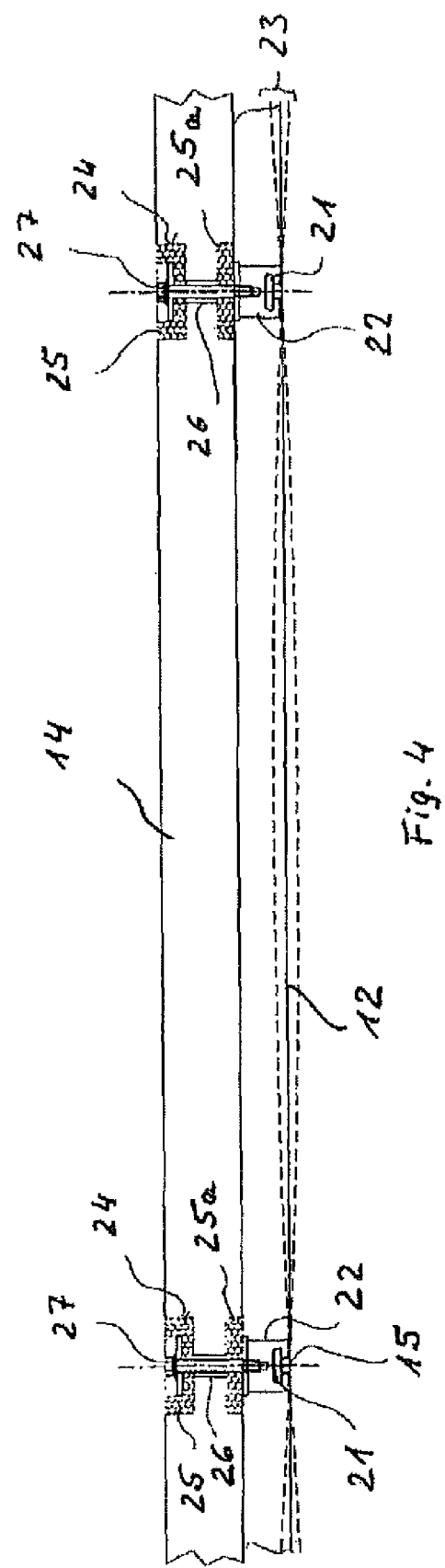

VIBRATIONS DAMPER FOR FASTENINGS ELEMENTS IN AIRCRAFTS

Figure 1:
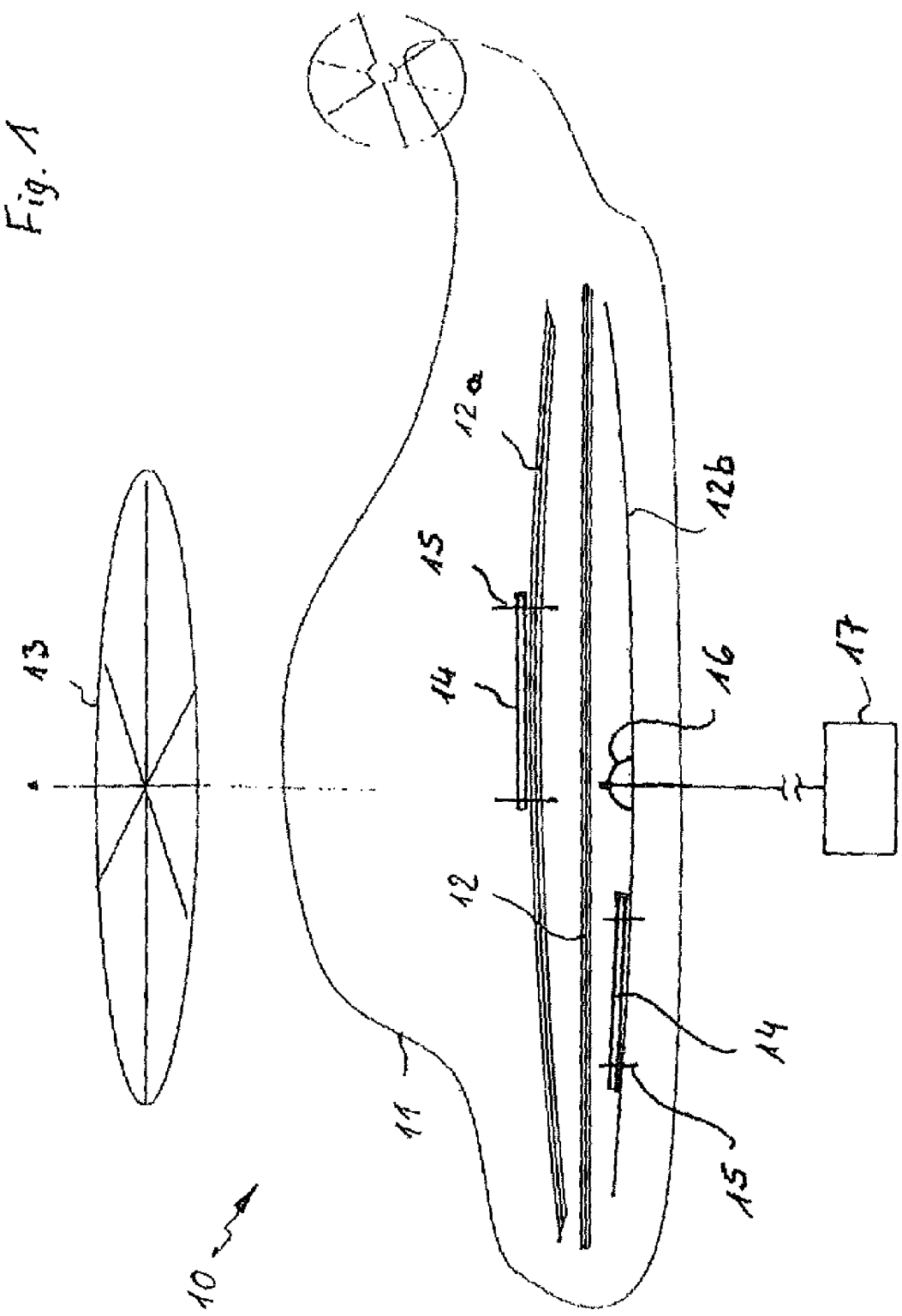

The invention relates to the means for fastening of built-in elements on the cell-side fastening points of a vehicle cell of a vehicle, in particular an aircraft, for transporting of goods and passengers as well as a vehicle cell having such fastening means and an aircraft having such vehicle cell.

Aircrafts are always constructively manufactured in the so-called light weight construction. They are employed for the most diverse applications. According to the application, they are equipped with the most diverse built-in elements, for example—mounted with aircraft seats, built-in cupboards, stretchers, containers or protective sheathing.

Generally, these built-in elements made in the form of a vehicle cell are bending-resistant, the materials of which, in the loading condition, are always located in the elastic region. Thus, they often bend a wing under stress by several meters. As a general rule, this is true for the structural elements in the fuselage area as well. The bending-resistant built-in elements are connected to the detachable fastening elements by these elastic structural elements in the fuselage area.

For this purpose, a quickly detachable fastening means is known from the document DE 10125216 C2, in which a mushroom shaped holding collar is pushed into the rear indentation of the fastening bars in the vehicle. The fastening bars are generally present on the vehicle side, and the fastening means can be pushed with its mushroom shaped holding collar behind the projections adjacent to the recesses.

The built-in elements exhibit another flexibility in the form of a vehicle cell. The aircrafts have a relatively higher deflection due to the flexibility of their vehicle cells, and in particular, the helicopter elastically deforms very intensely during take-off and landing.

The subsequently mounted built-in elements can not follow this elastically deformation of the vehicle cell and it can result in stress concentration with voltage peaks in the anchor—or fastening points, which can lead to material fatigue and catastrophic cracks in the vehicle cell.

It is the object of the present invention to arrive at a fastening means for a built-in element in the aircraft, by which the stress concentration due to voltage peaks at the fastening points is prevented in all the directions.

This object is achieved by the features claimed in patent claim 1. Advantageous embodiments of the invention are the subject matter of the subsidiary claims. In particular, this object is achieved by that the elastic coupling elements are assembled between the built-in elements and their cell-side fastener.

According to the invention, it is particularly advantageous that the built-in elements are connected in a vibration damping manner to the vehicle via three dimensional elastically yielding coupling elements.

According to the invention, the built-in elements, for example—the ballistic protection disc are elastically connected to the vehicle, preferably to an aircraft. Through these measures, the vehicle cell can be provided with built-in elements, which are relatively bending-resistant. By the dynamic stresses of the vehicle cell, the built-in elements can be shaken and displaced with respect to the respective vehicle cell walls at their fastening points. It is true that the relative movement is induced only within the millimeter to centimeter range, but they can lead to voltage peaks and stress concentrations in the material. By the measures according to the invention, such stress concentrations due to the voltage peaks in the cell walls are advantageously avoided, and material fatigue is prevented.

In a preferred embodiment of the vehicle cell according to the invention, in particular, in an aircraft cell, it is provided that the built-in elements are connected to the vehicle cell in a vibration dampening manner via the three dimensional elastic coupling elements. Subsequently, the built-in elements can also be mounted in a vibration dampening manner in a vehicle cell.

The fastening with the vehicle cell of the vehicle, namely of an aircraft, takes place elastically at the fastening point. Therefore, the three dimensional movements of the vehicle cell of the aircraft takes place without any redirection of the vibrations at the built-in elements.

The vehicle cell for an aircraft according to the invention exhibits the built-in elements, which are connected to the aircraft by means of elastic fastening means. As a result of this, a wide range of built-in elements are subsequently mounted in a vehicle cell. Without these elastic fastening means, the built-in elements are prematurely damaged due to mechanical stresses.

In another advantageous embodiment of the vehicle cell according to the invention, the built-in elements are the ballistic protection components.

In a particularly advantageous embodiment of the vehicle cell according to the invention, the ballistic built-in elements are hard protection discs.

In another particularly advantageous embodiment of the vehicle cell according to the invention, the ballistic protection components are the discs made of laminates, composites, aramides or polyethylene.

In accordance with an advantageous embodiment of the vehicle cell according to the invention, the built-in elements, for example—cabins, kitchens, racks for standard components and so on, can subsequently be assembled in a vehicle cell and connected to these elastically. As a result of this, practically each vehicle cell can be accommodated for the respective purpose in a quicker and cost effective manner, without which it is required to be changed in the process. The built-in elements are assembled and dismantled in a quicker and easier manner.

In a particularly preferred embodiment of the vehicle cell according to the invention, the built-in elements can be connected to the vehicle cell via the elastic fastening means on the floor rails of the aircraft. Inversely, the fastening rails can also be elastically fixed on the anchor points of the aircraft. In this way, no additional retrofitting measures are necessary on the vehicle cell, whereby the granted operational approval for the vehicle cell is maintained.

In another advantageous embodiment of the vehicle cell according to the invention, the built-in elements can be connected to the vehicle cell in a vibration dampening manner. As a result of this, the vibration noise that acts on the vehicle cell, is also damped in an advantageous manner and is not transmitted to the built-in elements.

In accordance with a particularly advantageous preferred embodiment of the vehicle cell according to the invention, the floor rails can be connected to the vehicle cell by means of rubber-metallic elements. Such type of rubber-metallic elements are especially suitable, in which the vibration forces produced in the vehicle cell are absorbed or at least reduced in such a manner that they can act by avoiding the voltage peaks. In order to accommodate, for example—an external load, which should be attached on the vehicle cell, elastic fastening means are provided.

In an advantageous embodiment of the vehicle cell according to the invention, the external load can be accommodated in a vibration dampening manner. As a result of this, the forces brought about by the external load are effectively kept away from the vehicle cell.

In another advantageous embodiment of the vehicle cell according to the invention, the external load can be flexibly connected to the vehicle cell. The aircraft according to the invention exhibits fastening means of the type described at the beginning.

In an advantageous embodiment of the aircraft according to the invention, the aircraft exhibits a vehicle cell of the type described at the beginning.

In accordance with another embodiment of the aircraft according to the invention, the aircraft is a helicopter.

Figure 2:
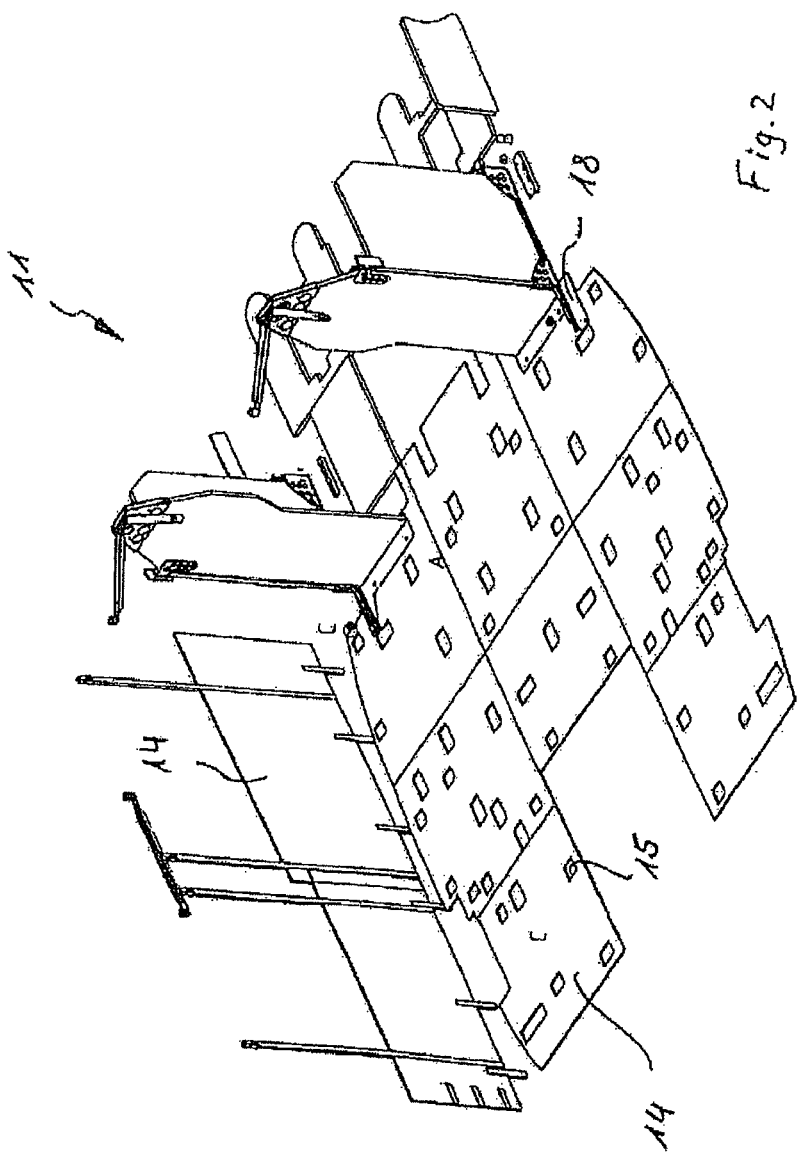
Figure 7:
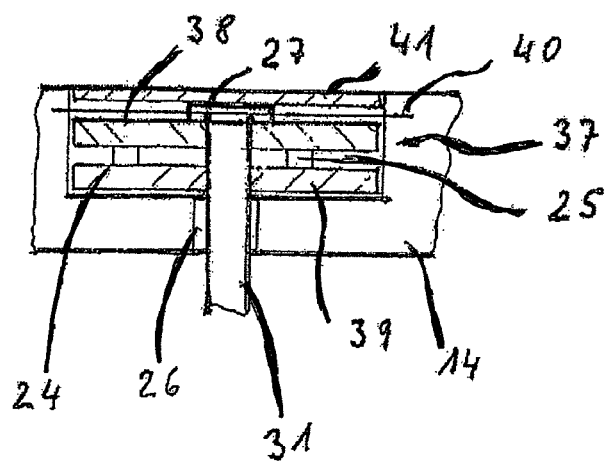
Figure 5:
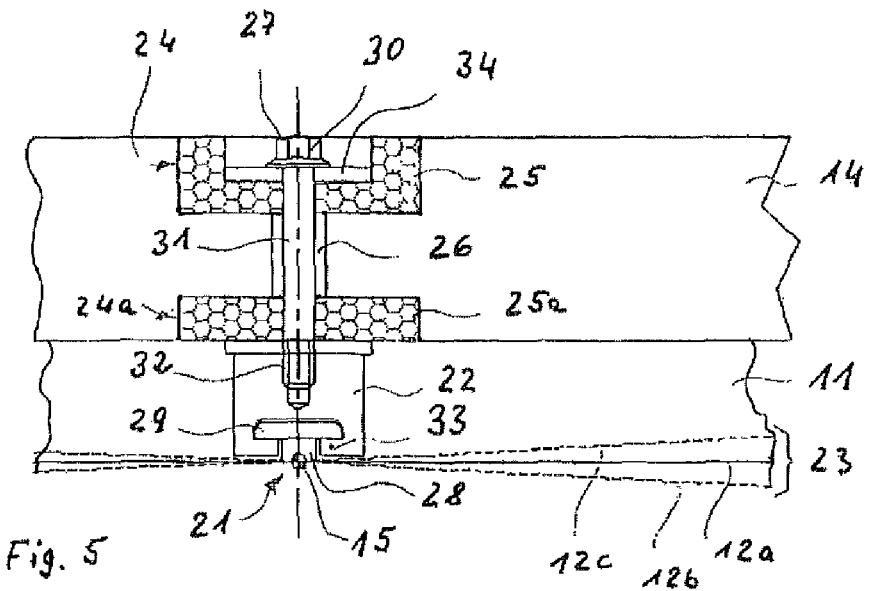
Figure 6:
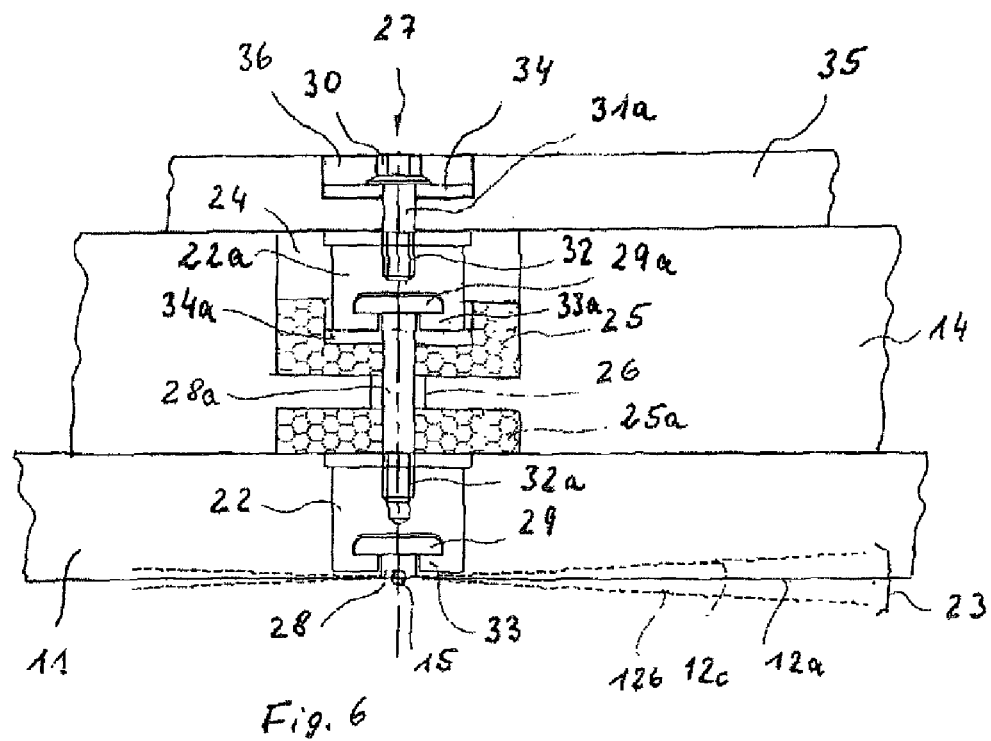

The invention is explained in the following in more detail with the help of the exemplary embodiments with reference to the enclosed drawings. It shows:

FIG. 1—a schematic side view of an aircraft, namely of a helicopter, having an unloaded vehicle floor board with a vehicle floor board bent upwards after the lifting off due to the tensile forces of the rotor;

FIG. 2—an isometric representation of an aircraft having holding means provided in the vehicle floor board area for retrofitting with built-in elements;

FIG. 3—a schematic representation of the fastening of the built-in elements according to the invention having elastic fastening means provided at various sides of the cell having stress concentration in the vehicle floor board, for example—of a helicopter, through the effects of the pressure;

FIG. 4—a detailed representation of the fastening of the built-in elements in the vehicle call of a vehicle with schematic representation of the deflection of the cell structure;

FIG. 5—a detailed representation of a fastening according to FIG. 4, with a holding means and three dimensional elastic coupling elements embedded in between;

FIG. 6—a detailed representation of a fastening means of a built-in element, with a second fastening means and another holding element for another built-in element having elastic coupling elements embedded in between according to FIG. 4;

FIG. 7—a detailed representation of an elastic coupling element, which consists of a double disc and a panel cover for an indentation.

The aircraft 10 schematically represented in FIG. 1, for example a helicopter, consists of a vehicle cell 11, as it is represented schematically in the FIG. 2.

The vehicle cell 11 represented in FIG. 1 exhibits a flat, elastic vehicle floor board 12 in rest. Here, represented as an example on the walls of the vehicle cell 11, most diverse built-in elements 14 are additionally assembled and fixed only by means of the vehicle floor board 12. Similarly, it can be equipped with, for example—aircraft seats, built-in cupboards, stretchers or containers or it can be armed with, for example—ballistic protection sheathings or jackets. For example, The ballistic built-in elements can consist of, for example—the ballistic protection discs, which are made of laminates, composites, aramides or polyethylenes and the like.

These built-in elements 14 are generally bending-resistant as the vehicle cell 11, the material of which in loaded condition always remains in the elastic limits. As a result, they exhibit a different dynamic behaviour as the vehicle cell 11. If the aircraft 10 is, for example—a taking-off or landing helicopter, i.e. taking-off or landing by means of its rotor, the vehicle cell 11 elastically deforms accordingly. As a result, there is relative movement between the built-in elements 14 and the vehicle cell 11.

When the helicopter 10 takes-off, its rotor 13 lifts the vehicle cell 11, whereby its loaded vehicle floor board 12a attains a convex shape. This can therefore, slightly displaces the built-in elements 14 fastened on the fastening point 15 on the cell-side with respect to the vehicle floor board 12a.

Frequently, external loads 17 are also transported by the helicopter 10, suspended on the external load fastenings 16. During lifting off one such external load 17, the vehicle cell 11 is deformed. whereby it maintains an externally loaded concave vehicle floor board 12b. Even in this case, the bending-resistant, built-in elements 14 that are fixed on the cell-side fastening points 15, are displaced with respect to the vehicle floor board 12b.

The flat vehicle floor board 12 of an aircraft cell 11 schematically represented in FIG. 3 is provided with a plurality of cell-side fastening points 15. The built-in elements 14 are connected to the vehicle floor board 12 or the vehicle side walls via these cell-side fastening points 15, which can also be found in or on the cell-side floor rails 18.

When the helicopter 10 takes-off or lands, the vehicle floor board 12 bends in either a convex or a concave manner. The bending-resistant built-in elements 14 are displaced with respect to the vehicle floor board 12, by the transmitted forces. The cell-side fastening points 15 cannot follow these relative movements.

It is true that the relative movement is induced only within the millimeter to centimeter range. In spite of this, they can lead to voltage peaks and to stress concentrations 20 in the material of the vehicle cell 11, in the region of the fastening points 15. Such stress concentrations 20 can lead to material fatigue and disastrous cracks in the vehicle cell 11.

As shown in FIG. 4, the elastic coupling elements 25 and 25a are additionally provided according to the invention, in order to avoid relative movement between accommodated built-in elements 14 and the stress concentrations 20 induced thereby.

The cell-side fastening points 15 are associated with the fastening means 21. The elastic coupling elements 25 and 25a, for exampl—can be rubber-metal elements, elastomers, rubber damper or the like, which can also damp the vibration induced noises in the vehicle cell 12 at the same time.

There is also a possibility for the permanently elastic splices or elastic hook and loop fasteners made of fleece and hook bands, by which the built-in elements 14 can be connected to the vehicle cell 11. Such permanently elastic splices can absorb elongations of up to 500% for a short time.

The fastening means 21 can be, for example—a so-called holding or holding mushroom, as it is generally known. The elastic coupling elements 25 and 25a can be detachably fixed to the holding elements 22 on the holding mushroom 21 of the cell-side fastening point 15.

The vehicle floor board 12 can be moved by the elastic elements 25 and 25a by a three dimensional deflection of the cell structure 23 with respect to the bending-resistant built-in elements 14. Therefore, material fatigue with disastrous crack formation due to stress concentrations 20, can be avoided.

As shown in detail in FIG. 5, the built-in elements 14, for example—a ballistic protection disc, is provided with a plurality of indentations 24 or 24a for its fastening on the floor board 12 of a vehicle cell 11. In the exemplary embodiment shown, the inner side indentations 24 are provided opposite the indentations 24a, which is located on the underside of the built-in elements 14.

The indentation 24 or 24a are aligned directly above the cell-side fastening point 15. An elastic coupling element 25 is inserted in the indentation 24 and a built-in element 25a is inserted in the oppositely located indentation 24a.

A bore 26 is drilled through the elastic coupling element 25 as well as through the protection disc 14 to be mounted. A bolt shank 31 of a fastening means 27, for example—of a holding bolt or a screw, passes through this bore 26. the bolt shank 31 exhibits a clearance with respect to the inner wall of the bore 26, in order to absorb three dimensional vibrations and to transmit them to the coupling elements 25 and 25a.

The holding bolts 27 exhibit a bolt head 30, which rest upon the load distribution element 34 on the elastic coupling element 25.

The bolt shank 31 is provided with a screw thread 32 on its free end opposite the bolt head 30. The bolt shank 31 can be detachably connected to a holding element 22, for example— it can be screwed into the holding element 22 by the screw thread 32.

The holding element 22 is provided with a holding claw 33 on its side facing the vehicle floor board 12. The holding claw 33 can be brought in engagement with a cell-side fastening means 21 configured as a holding mushroom. The holding claw 33 can be pushed under the mushroom head 29 of the holding mushroom 21 and is fixed in its position with a locking (not represented).

The holding mushroom 21 consists of a mushroom head 29 and a mushroom shank 28, by which it is fixed on the cell-side fastening point 15. For mounting a built-in element 14, the bolt shank 31 of the holding bolt 27 is passed through the elastic coupling elements 25 and 25a and the bore 26 up to the region of the holding element 22. As the holding bolt 27 is provided with a screw thread 32, it can be screwed into the holding element 22 and fastened variably.

On tightening, the holding claw grips under the holding mushroom 21, and the bolt head 30 rests on the load distribution element 34 of the upper elastic coupling element 25. The lower elastic element 25a rests on the holding element 22.

The spring rate of the elastic coupling element 25 and 25a can be variably adjusted by the tightening device. After achieving the desired locking and the desired spring rate, the tightening device can be secured and locked by means of an arresting means 40.

In the embodiment in accordance with FIG. 6, another holding means 22a is provided according to the invention. The further holding element 22a grips the holding claw 33a under a further mushroom head 29a. The further mushroom head 29a is integrally connected to a further extended mushroom shank 28a. The extended mushroom head 28a passes through a bore 26 in the built-in element 14 and through the elastic coupling elements 25 and 25a and is provided with a further screw thread 32a on its lower free end.

The extended mushroom shank 28a can be connected to the holding element 22 of the vehicle cell 11 by the screw thread 32a. For example, the extended mushroom shank 28a can be screwed into the holding element 22.

The tipper further holding element 22a with a load distribution element 34a rests on the upper elastic coupling element 25. It is terminated on its upper side flush with the mounted bending-resistant built-in element 14, for example—a ballistic protection disc. Further built-in elements 35, for example—cupboards, seats etc., can be fastened on a bending-resistant ballistic protection disc 14 on this further mushroom head 29a.

The further built-in element 35 is provided with an indentation 36 on its side facing the bending-resistant ballistic protection disc 14. A load distribution element 34 is inserted into the indentation 36. A bolt shank 31a of a holding bolt 27 passes through the indentation 36 and the load distribution element 34.

The holding bolt 27 is provided with a screw thread 32 on its lower free end, by which it can be connected to the holding element 22a in the indentation 24 of the ballistic protection disc 14. For example, it can be screwed into the holding element 22a and secured with the arresting means (not represented in detail). Therefore, the built-in elements 14 (not represented in detail) are randomly fixed on the further holding mushroom 29a. Even these built-in elements 14 are decoupled from the vibrations of the vehicle cell 11 three dimensionally through the elastic coupling elements 25 and 25a.

As shown in FIG. 7, the elastic coupling elements 25 can also be disposed between a double disc 37, which can be inserted in the mentioned indentations 24 of a built-in element 14. This double disc 37 consists of an upper disc 38 and a lower disc 39, between which a plurality of small elastic coupling elements 25, which are not connected to each other, are provided.

An elastic coupling element 25 configured in ring shaped can also be provided. The elastic coupling elements 25 or the double disc 37 can be covered by a panel cover 41 or is terminated flush with the upper edge of the respective built-in element 14.

As mentioned above, the double disc 37 is connected to the holding elements 22 or 22a (not represented here) in the built-in element 14 by means of the fastening means 27 passing through the bore 26. Thereafter, the fastening means 27 is arrested and secured by the arresting means 40. The fastening means 27 has a sufficient clearance in the bore 26, in order to be able to absorb three dimensional vibrations.

Reference Numerals
10 Aircraft/Helicopter
11 Vehicle cell
12 Vehicle floor board, unloaded
12a Vehicle floor board, air loaded
12b Vehicle floor board, externally loaded
13 Rotor
14 Bending-resistant built-in element
15 Cell-side fastening point
16 External load fastening
17 External load
18 Floor rails
19 Force Direction
20 Stress concentration
21 Fastening means / Holding mushroom
22, 22a Holding element
23 Deflection of the cell structure
24, 24a Indentation
25, 25a Elastic coupling element
26 Bore
27 Fastening means/holding bolts
28, 28a Mushroom shank
29, 29a Mushroom head
30 Bolt head
31, 31a Bolt shank
32, 32a Screw thread
33, 33a Holding claw
34, 34a Load distribution element
35 Further built-in element
36 Indentation
37 Double disc
38 Upper disc
39 Lower disc
Arresting means
Panel cover

I claim:

1. Fastening assembly of built-in parts on cell-side fastening points of an vehicle cell of for carrying goods and passengers, at the cell-side fastening points of the vehicle cell via elastic coupling means on the cell-side fastening points of the vehicle cell, wherein the elastic coupling means are set into indentations on an upper surface of the built-in parts, the elastic coupling means including two disc shaped holding discs, and at least two elastic coupling elements which are disposed in the form of points/clots between the two disc shaped holding discs, and fastening means are provided for connecting the two disc shaped holding discs to the cell-side fastening points of the vehicle cell, wherein each of the fastening means is a bolt having a shaft which extends through a hole in each of the disc shaped holding discs and a hole in a lower surface of the built-in part, and is fixed at a lower end thereof to the vehicle cell, wherein the points/clots between the two disc shaped holding discs are positioned radially from the shaft further than the hole in the lower surface of the built-in part.

2. Fastening assembly according to claim 1, wherein the built-in parts are ballistic protection discs made of laminates, composites, aramides or polyethylenes.

3. Fastening assembly according claim 1, wherein the built-in parts are ballistic protection discs, protection sheathing/jackets, fastening—or transport frames for transporting equipment.

* * * * *